Feb. 28, 1928.
L. J. LARSEN
1,660,927
SNAP HOOK FOR SAILS
Filed June 11, 1926
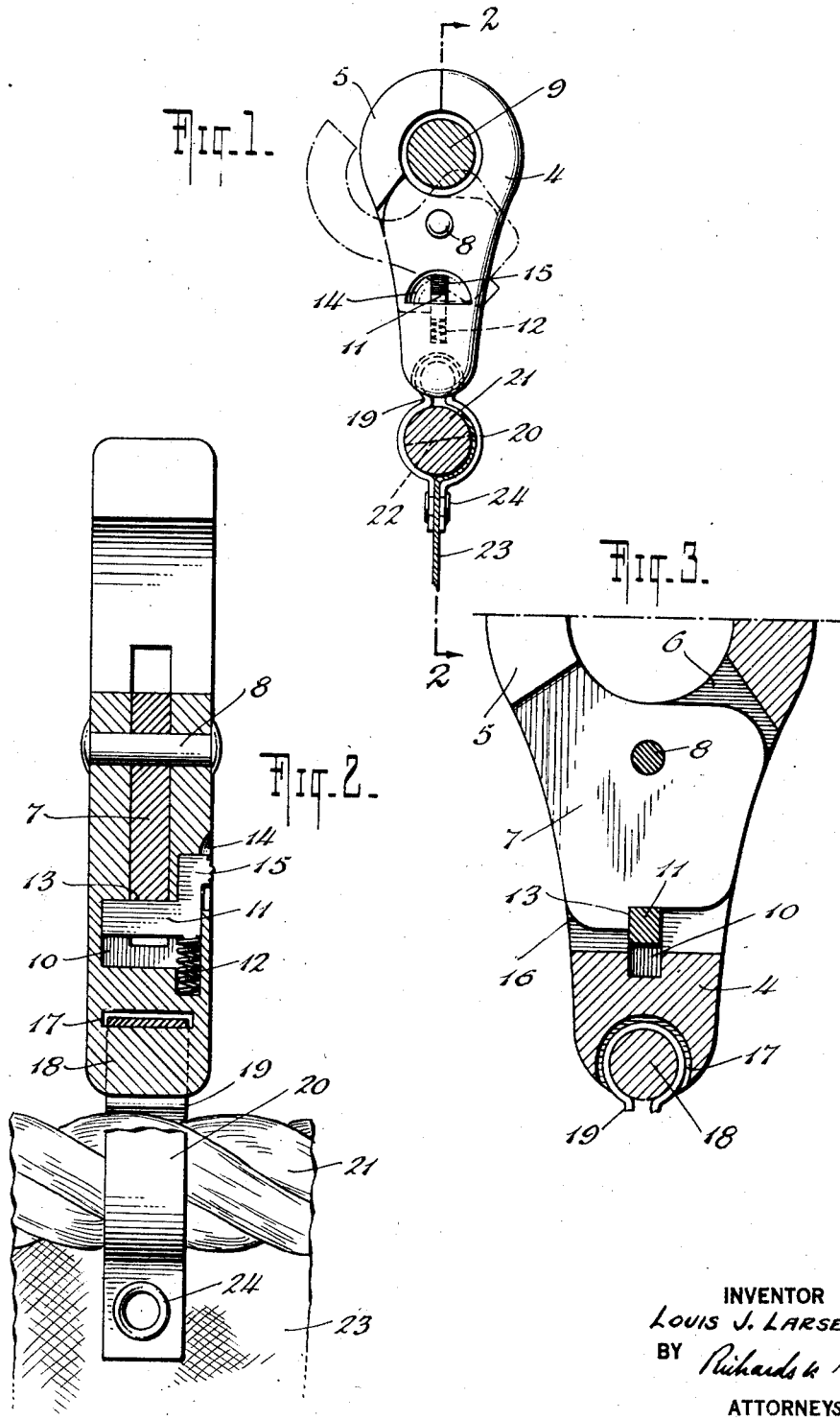
INVENTOR
LOUIS J. LARSEN
BY Richards & Geier
ATTORNEYS Patented Feb. 28, 1928.

1,660,927

UNITED STATES PATENT OFFICE.

LOUIS J. LARSEN, OF LONG ISLAND CITY, NEW YORK.

SNAP HOOK FOR SAILS.

Application filed June 11, 1926. Serial No. 115,154.

This invention relates to improvements in snap hooks, and has particular reference to a hook especially adapted for use with sails.

An object of the invention is to provide an improved hook by means of which a sail may be readily and quickly attached to and detached from a supporting stay or rope along which said sail is adapted to slide when being furled or unfurled.

Another object is to effectively retain the cooperating members of the hook in closed position by interlocking the same with a detent, which is easily accessible and operable to release said members so as to permit of the detachment of the hook from a stay or rope.

The above and other objects will appear more clearly from the following detail description, when taken in connection with the accompanying drawing, which illustrates a preferred embodiment of the inventive idea.

In the drawing—

Figure 1 is an elevation of the hook constructed in accordance with the invention, and showing the same attached to a sail and also to a supporting stay or rope, one of the hook members being shown opened in dotted lines;

Figure 2 is a section on the line 2—2 of Figure 1; and

Figure 3 is a fragmentary vertical section taken at right angles to Figure 2.

Referring more particularly to the accompanying drawing, the numerals 4 and 5 indicate, respectively, the two cooperating hook members constituting the hook of the present invention. The member 4 is bifurcated intermediate its ends and in the shank portion thereof to form a recess 6 for receiving the inner end 7 of the hook member 5. A rivet or other suitable pin 8 is extended through the two members 4 and 5 to pivotally connect the same so that the latter member may be swung to open and closed positions relative to the member 4. The outer ends of the two hook members are made arcuate and of similar formation so that when their extremities are brought together the plane of the transverse portions of the meeting ends thereof will be in alignment with the longitudinal center of the hook members passing through the pivot 8 and will combine to form an opening for receiving a stay or rope 9 along which the hook may be moved. By thus bringing the transverse ends or faces of the hook members together, and not overlapping said ends as is customary in devices of this character, it will be apparent that when the hook members are unlocked to release a rope held therein said rope will readily release itself from the members by a direct outward movement and will have no tendency to be caught by either of the members.

To lock the hook members in closed position the walls of the recess 6 are provided with opposed grooves or channels 10 in which the end portions of a detent 11 are slidably mounted, the detent being normally held in locking position by a coil spring 12 engageable with one end of said detent. When the members are locked the detent 11 engages in a notch 13 formed in the inner end 7 of the member 5 and when in this position said member will be prevented from swinging to the dotted line position in Figure 1. One outer face of the member 4 is provided with a recess 14 which communicates with the recess 6 and into which a serrated extremity 15 of the detent 11 projects so that said extremity may be engaged by a finger or the thumb in order to force said detent out of engagement with the notch 13 against the tension of the spring 12. When this is done the member 5 may be moved about its pivot to open position and thus release the hook from the stay 9. The detent may then be released to permit of its restoration to normal position. When the member 5 is again swung to closed position, the rounded extremity 16 of said member will permit the inner end thereof to ride over the detent 11 temporarily depressing the same until the member it fully closed, whereupon the detent is moved to its locking position by the spring 12.

In order to attach the hook to a sail the reduced or inner end of the member 4 is provided therein with an arcuate groove 17 forming a supporting portion 18. The intermediate or bight portion of a sail-attaching member 19 is inserted into the groove 17 and embraces the portion 18 so as to connect said member 19 to the hook. The member 19 which is made of a single length of material has its opposed sides bent to provide a substantially circular portion 20 for receiving a rope 21. To this rope is stitched or otherwise secured, as indicated at 22, the edge of a sail 23 and the portion of said sail which extends partially about the rope is interposed between the latter and one side of the circular portion 20. A rivet or other suitable fastener 24 is extended through the extremities of the member 19 and that portion of the sail disposed between said extremities so as to securely attach the member 19 to the sail.

What is claimed is:

A hook including cooperating members one of which is provided at one end with a groove forming a supporting portion, a sail-attaching member having an intermediate portion engageable in said groove and embracing said supporting portion, said member also having another portion adapted to embrace a rope and clamp a part of a sail between the same and said rope, and means for securing the ends of said member to said sail.

In testimony whereof I have affixed my signature.

LOUIS J. LARSEN.